(12) United States Patent
Shima et al.

(10) Patent No.: US 8,429,304 B2
(45) Date of Patent: Apr. 23, 2013

(54) INFORMATION PROCESSING APPARATUS AND COMMUNICATION CONTROL METHOD

(75) Inventors: Koji Shima, Kanagawa (JP); William Parks, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1507 days.

(21) Appl. No.: 11/545,697

(22) Filed: Oct. 10, 2006

(65) Prior Publication Data

US 2007/0083672 A1    Apr. 12, 2007

(30) Foreign Application Priority Data

Oct. 11, 2005 (JP) ................... 2005-296639

(51) Int. Cl.
*G06F 15/16* (2006.01)
*G06F 15/167* (2006.01)
*G06F 15/173* (2006.01)
*H04L 12/28* (2006.01)

(52) U.S. Cl.
USPC ........... 709/250; 709/212; 709/223; 709/224; 709/225; 709/226; 709/249; 370/389; 370/392; 370/412; 718/1; 718/104; 718/105

(58) Field of Classification Search ........... None
See application file for complete search history.

(56) References Cited

U.S. PATENT DOCUMENTS

| | | | |
|---|---|---|---|
| 4,507,781 A * | 3/1985 | Alvarez et al. ........... | 370/266 |
| 6,480,941 B1 * | 11/2002 | Franke et al. ............ | 711/153 |
| 6,681,258 B1 * | 1/2004 | Ratcliff et al. ........... | 709/245 |
| 6,778,540 B1 * | 8/2004 | Ratcliff et al. ........... | 370/401 |
| 7,051,180 B2 * | 5/2006 | Downer et al. ........... | 711/173 |
| 7,356,608 B2 * | 4/2008 | Rimmer ................... | 709/238 |
| 7,739,415 B2 * | 6/2010 | Banzhaf et al. .......... | 709/250 |
| 7,757,007 B2 * | 7/2010 | Banzhaf et al. .......... | 709/250 |
| 8,122,152 B2 * | 2/2012 | Chittenden et al. ...... | 709/245 |
| 2003/0131067 A1 * | 7/2003 | Downer et al. ........... | 709/213 |
| 2003/0131214 A1 * | 7/2003 | Downer et al. ........... | 712/13 |
| 2003/0189936 A1 * | 10/2003 | Terrell et al. ............ | 370/395.31 |
| 2005/0089048 A1 * | 4/2005 | Chittenden et al. ...... | 370/395.54 |
| 2007/0083672 A1 * | 4/2007 | Shima et al. ............. | 709/245 |
| 2008/0181232 A1 * | 7/2008 | Banzhaf et al. .......... | 370/395.3 |
| 2011/0239213 A1 * | 9/2011 | Aswani et al. ........... | 718/1 |

FOREIGN PATENT DOCUMENTS

JP            9-204376           8/1997

* cited by examiner

*Primary Examiner* — Backhean Tiv
(74) *Attorney, Agent, or Firm* — Frommer Lawrence & Haug LLP; William S. Frommer

(57) ABSTRACT

Logical partitions in an information processing apparatus share an IP address and are assigned different MAC addresses. A representative logical partition communicates with an external entity on behalf of the other logical partitions. A driver is provided with a virtual interface and a physical interface. Internal communication between the logical partitions is done via the virtual interface and communication with an external entity is done via the physical interface. If a packet received from an external destination is destined to one of the other logical partitions, the protocol stack of the representative logical partition replaces the destination MAC address by the MAC address of the destination logical partition. The protocol stack provides the packet in which the destination MAC address has been replaced to the virtual interface. The virtual interface transfers the packet provided by the protocol stack to the destination logical partition.

12 Claims, 7 Drawing Sheets

FIG.4A

| TYPE |
| --- |
| PROTOCOL |
| PORT NUMBER |
| RESULT |
| EVENT ID |
| MAC ADDRESS |

FIG.4B

| PORT NUMBER | MAC ADDRESS |
| --- | --- |
| 5000 | MAC1 |
| 5002 | MAC2 |
| ⋮ | ⋮ |

44

INFORMATION PROCESSING APPARATUS AND COMMUNICATION CONTROL METHOD

BACKGROUND OF THE INVENTION

1. Field of the Invention

The present invention relates to an information processing apparatus and a communication control method which allow each of multiple logical partitions to communicate with an external entity.

2. Description of the Related Art

A technology is known in which computing resources in a single computer system including a CPU, memory, I/O device, etc. are divided into multiple logical partitions in which operating systems are run independently. In a computing system provided with logical partitions, a basic program called a hypervisor for controlling logical partitions is usually run. A hypervisor assigns computing resources to the logical partitions so that each logical partition operates as a single virtual computer.

The technology for logical partitioning is used for purposes including implementing a multi-operating system in which multiple different operating systems are run in a single computer and running applications in parallel by viewing a single computer as virtual parallel computers.

Home users usually subscribe to a single line and so only one global IP address for connection to an external network is available. This poses a challenge if it is desired that the logical partitions in a multi-partition system concurrently communicate with an external entity. In such a case, some mechanism is needed which allows a single IP address to be shared by multiple logical partitions. To allow multiple computers in a local network to communicate with an external entity, a router is normally installed at a point of connection to an external network. The router converts between global IP addresses and private IP addresses by running network address translation (NAT).

The header of a TCP or a UDP packet contains a checksum including source and destination IP addresses and source and destination port numbers. NAT requires updating of a checksum when changing the IP address or the port number of a packet. Thus, significant overhead is incurred.

SUMMARY OF THE INVENTION

Accordingly, a general purpose of the present invention is to provide a communication technology which allows each of multiple logical partitions to efficiently communicate with an external entity.

According to at least one embodiment of the present invention, an information processing apparatus is provided with a plurality of logical partitions assigned logically divided computing resources, and configured such that operating systems are independently run in the respective logical partitions. At least one of the plurality of logical partitions, which share a network address uniquely identifiable by an external network, communicates with an external entity on behalf of the other logical partitions. The at least one logical partition comprises: a port assignment unit which assigns communication ports available for communication with an external entity to the other logical partitions; and a router which routes a packet received at a communication port assigned to one of the other logical partitions to the one of the other logical partitions.

In the case of an IP network, the term "network address uniquely identifiable by an external network" refers to an IP address necessary for communication with the information processing apparatus from an external network. Routing of a received packet to one of the other logical partitions may be achieved by transmission by a virtual network driver, transmission using communication equipment such as a switching hub, memory-to-memory copy by a driver, communication using a mechanism especially provided for communication between logical partitions, etc. Any means for routing may be employed as long as packets are routed in some way.

There is also provided an information processing apparatus in which a plurality of computers are connected to each other so as to form a cluster, at least one of the plurality of computers, which share a network address uniquely identifiable by an external network, communicates with an external entity on behalf of the other computers, the at least one computer comprising: a port assignment unit which assigns communication ports available for communication with an external entity to the other computers; and a router which routes a packet received at a communication port assigned to one of the other computers to the one of the other computers.

There is also provided a communication control method for an information processing apparatus provided with a plurality of logical partitions assigned logically divided computing resources, and configured such that operating systems are independently run in the respective logical partitions, wherein if at least one of the plurality of logical partitions, which share a network address uniquely identifiable by an external network, communicates with an external entity on behalf of the other logical partitions, the at least one logical partition assigns communication ports available for communication with an external entity to the other logical partitions, and routes a packet received from an external entity at a communication port assigned to one of the other logical partitions to the one of other logical partitions.

Optional combinations of the aforementioned constituting elements, and implementations of the invention in the form of methods, apparatuses, systems computer programs, data structures, recording mediums, etc. may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4A shows the data format of a packet used to reserve a port according to the embodiment;

FIG. 4B shows an example of a port assignment table;

DETAILED DESCRIPTION OF THE INVENTION

The invention will now be described by reference to the preferred embodiments. This does not intend to limit the scope of the present invention, but to exemplify the invention.

Figure 1:
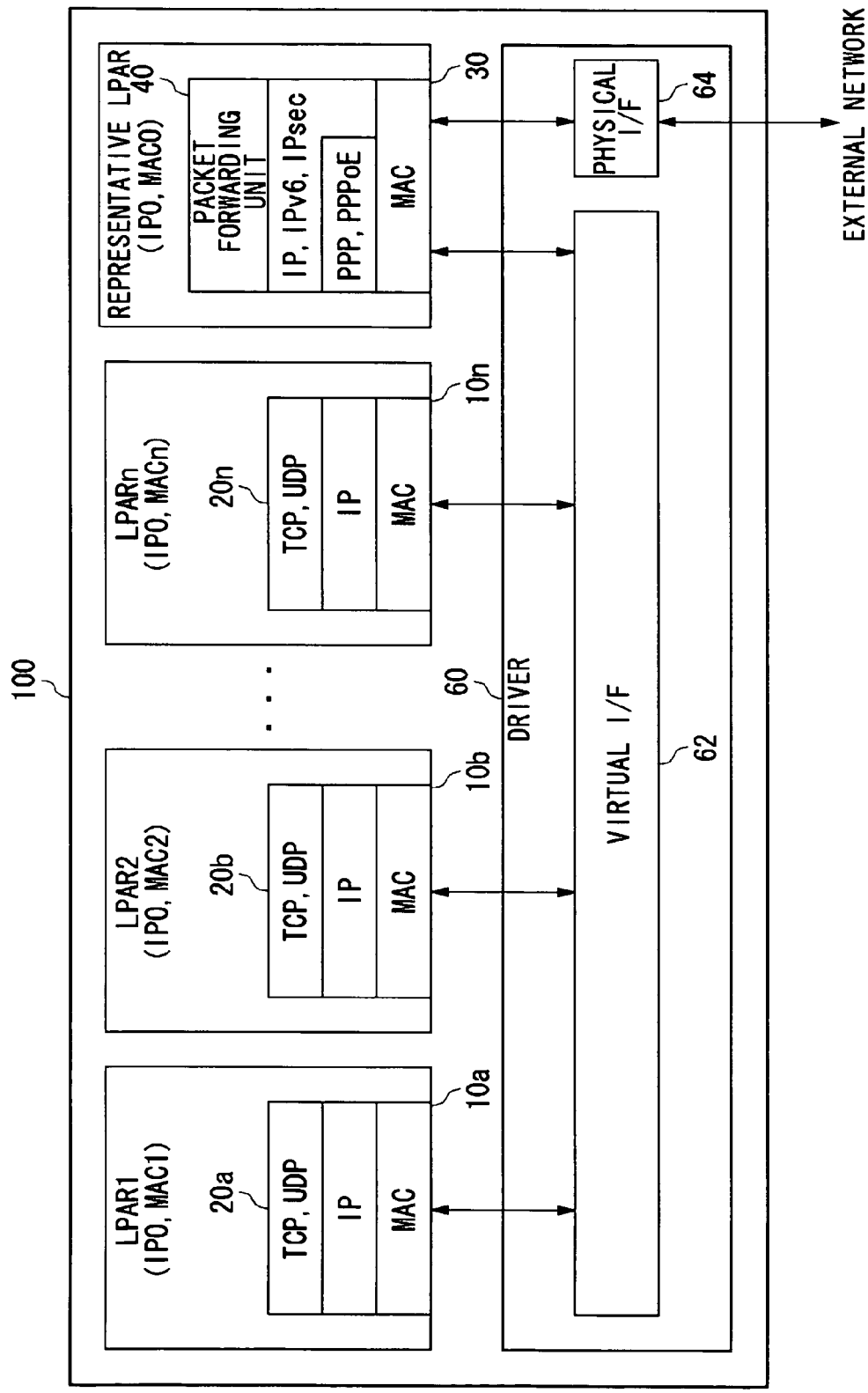
FIG. 1 shows the structure of an information processing apparatus according to an embodiment of the present invention.

FIG. 1 shows the structure of an information processing apparatus according to an embodiment of the present invention.

The information processing apparatus 100 is a computer provided with computing resources such as a processor, a memory, an I/O device, etc. The information processing apparatus 100 is divided into multiple logical partitions (hereinafter, referred to as LPARs) 10a, 10b, . . . , 10n and 30. Computing resources are assigned to LPARs 10a-10n and 30. Operating systems are independently run on the LPARs using the computing resources assigned.

LPARs 10a-10n and 30 are assigned Media Access Control (MAC) addresses that uniquely identify them. Meanwhile, an IP address is shared by LPARs 10a-10n and 30. One LPAR (LPAR 30) (hereinafter, referred to as representative LPAR) communicates with an external entity on behalf of the other LPARs (LPARs 10a-10n) (hereinafter, referred to as "LPAR1"-"LPARn").

The MAC addresses assigned to LPAR1, LPAR2, LPARn are MAC1, MAC2, . . . , MACn. The MAC address assigned to representative LPAR is MAC0.

LPAR1, LPAR2, . . . , LPARn and representative LPAR are connected to each other via a virtual network interface (hereinafter, referred to as a virtual interface) 62. Virtual communication is enabled by designating the individually assigned MAC address as a source address and a destination address. For communication between LPARs, virtual Ethernet (™) may be used as an example.

LPAR1, LPAR2, . . . , LPARn may share a global IP address as a common IP address but are not capable of directly communicating with an external entity. Representative LPAR has a global IP address or a private IP address assigned thereto and is able to directly communicate with an external network via a physical network interface (hereinafter, simply referred to as a physical interface) 64.

When LPAR1, LPAR2, . . . , LPARn communicate with an external network, representative LPAR obtains an IP address by a protocol such as PPPoE (PPP over Ethernet) and shares the IP address with LPARs 10a-10n. The IP address shared by all of LPARs 10a-10n and 30 will be referred to as IP0.

LPAR1, LPAR2, . . . , LPARn and representative LPAR have network protocol stacks (hereinafter, simply referred to as "protocol stacks") 20a, 20b, . . . , 20n and 40, respectively. The LPARs generates a packet destined to a MAC address or an IP address in accordance with a network protocol and delivers the generated packet to a network driver (hereinafter, simply referred as a "driver") 60.

Each of the protocol stacks 20a-20n of LPAR1-LPARn process protocol such as Ethernet (MAC), IP, TCP/UDP, etc.

The protocol stack 40 of representative LPAR30 processes protocols such as: Ethernet (MAC); Point to Point Protocol (PPP) or PPPoE; IP, IPv6 or Security Architecture for Internet Protocol (IPsec); and TCP/UDP. The protocol stack 40 also forwards packets to LPAR1-LPARn.

The driver 60 is provided with a virtual interface 62 and a physical interface 64. Internal communication between LPAR1, LPAR2, . . . , LPARn and representative LPAR is conducted via the virtual interface 62. Communication with an external entity is conducted via the physical interface 64.

The virtual interface 62 arbitrates requests for communication from LPAR1-LPARn. If any of the protocol stacks 20a-20n of LPAR1-LPARn provides a packet destined to the MAC address (MAC0-MACn) of another LPAR to the virtual interface 62, the virtual interface 62 transfers the packet to the destination LPAR.

If any of the protocol stacks 20a-20n of LPAR1-LPARn provides to the virtual interface 62 a packet destined to a MAC address other than the MAC addresses (MAC0-MACn) of the other LPARs, the virtual interface 62 transfers the packet to representative LPAR since the packet is to be transmitted to an external network.

The physical interface 64 receives a packet destined to an external entity from the protocol stack 40 of representative LPAR. The physical interface 64 then transmits the packet to a network device provided with, for example, a switching hub function, using a direct memory access (DMA) channel. The physical interface 64 also receives an interrupt from the network device so as to receive a packet destined to representative LPAR from the network device, using a DMA channel. The physical interface 64 delivers the received packet to the protocol stack 40 of representative LPAR.

A packet forwarding unit of the protocol stack 40 of representative LPAR replaces the destination MAC address by the MAC address of the destination LPAR if the packet received from an external source is destined to one of LPAR1-LPARn. The protocol stack 40 provides the packet in which the destination MAC address has been replaced to the virtual interface 62 to transmit it to the destination LPAR. The virtual interface 62 transfers the packet provided by the protocol stack 40 to the destination LPAR.

The driver 60 is provided in a basic system called a hypervisor for exercising control of assigning computing resources to LPAR1-LPARn and representative LPAR. The driver 60 may operate on a continuous basis or the driver 60 may be assigned computing resources as an LPAR. In the latter case, the driver 60 represents a process which is run in a time shared mode, like the operating systems in LPAR1-LPARn and representative LPAR. The driver 60 may be provided in representative LPAR.

Figure 2:
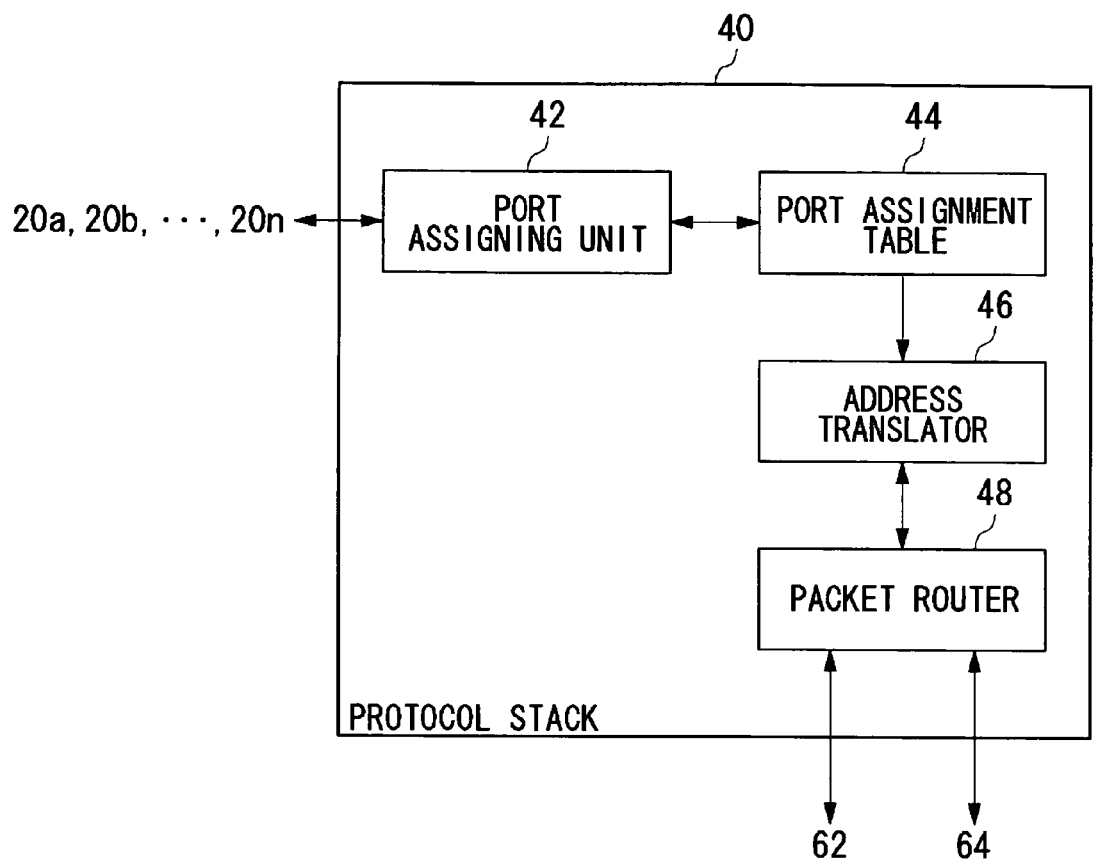
FIG. 2 shows the structure a protocol stack implemented in representative LPAR of FIG. 1.

FIG. 2 shows the protocol stack 40 of representative LPAR. The functional composition related to ordinary network protocol processing is omitted from the illustration. Only the functional composition unique to the embodiment is illustrated.

The protocol stack 40 of representative LPAR assigns available communication ports to LPAR1-LPARn for communication with an external entity on behalf of LPAR1-LPARn. A port assigning unit 42 receives a request for assignment of a port from the protocol stacks 20a-20n of LPAR1-LPARn. The port assigning unit 42 looks up a port assignment table 44 and replies to the protocol stacks 20a-20n of LPAR1-LPARn to indicate whether port assignment is permitted.

The port assignment table 44 stores the port numbers assigned to LPAR1-LPARn in association the MAC addresses of LPAR1-LPARn.

A packet router 48 deals with packets that LPAR1-LPARn exchange with an external entity, by transmitting a packet, received from LPAR1-LPARn via the virtual interface 62 and destined to an external destination, to an external destination via the physical interface 64, and by transmitting a packet, destined to LPAR1-LPARn and received from an external source via the physical interface 64, to LPAR1-LPARn via the virtual interface 62.

In order to route packets that LPAR1-LPARn exchange with an external entity, it is necessary to translate source MAC addresses and destination MAC addresses in the packets. An address translator 46 receives a packet to be routed from the packet router 48 and translates the source MAC address or destination MAC address of the packet.

Upon receiving a packet originated by one of LPAR-LPARn and destined to an external destination from the packet router 48, the address translator 46 translates the source MAC address of the packet by replacing the MAC address of one of LPAR1-LPARn by the MAC address of representative LPAR before delivering the packet to the packet router 48. The packet router 48 delivers the packet in which the source MAC address is replaced by the MAC address of representative LPAR to the physical interface 64 before transmitting the packet to an external destination.

Upon receiving a packet transmitted from an external source at a communication port via the packet router 48, the address translator 46 refers to the port assignment table 44 so as to obtain the MAC address of the LPAR assigned the receiving port (referred to as "assignment destination LPAR"). The address translator 46 replaces the destination MAC address of the received packet by the MAC address of the assignment destination LPAR identified by referring to the port assignment table 44, before delivering the packet to the packet router 48. The packet router 48 delivers the packet in which the destination MAC address is replaced by the MAC address of the assignment destination LPAR to the virtual interface 62, which transfers the packet to the assignment destination LPAR.

Figure 3:
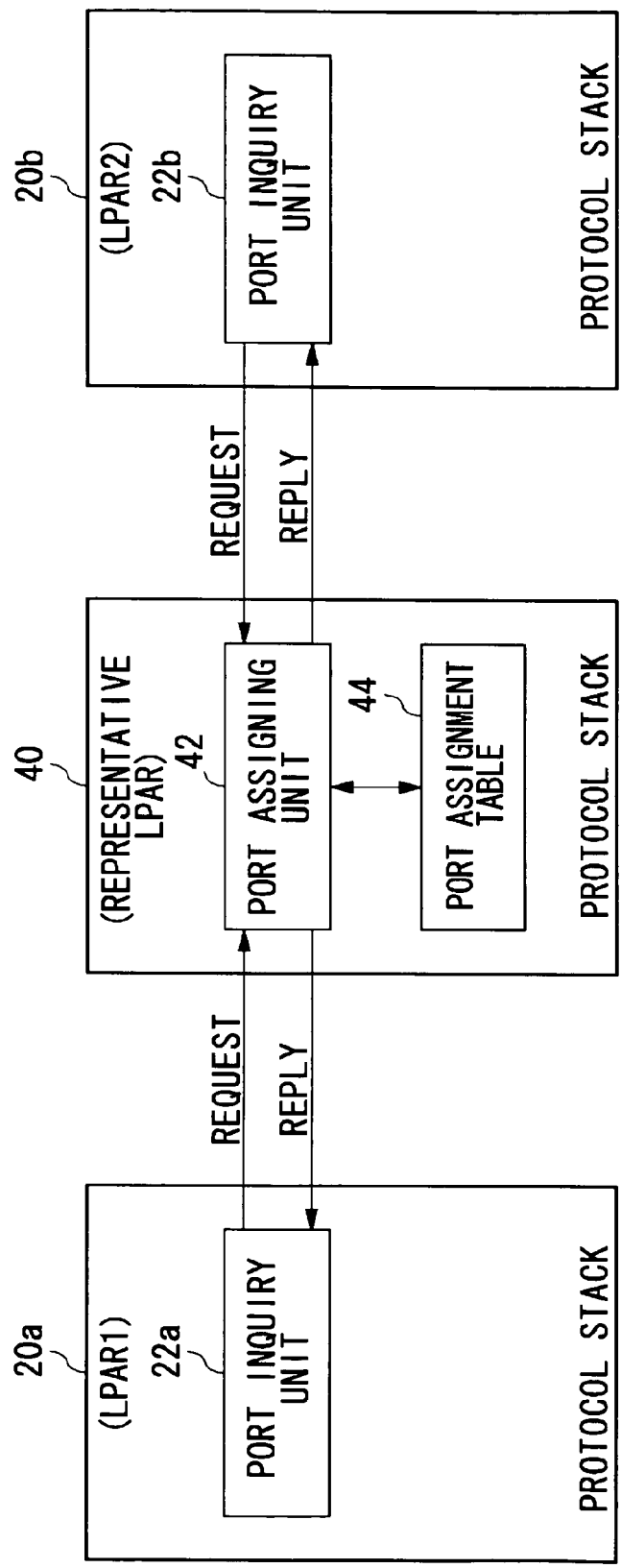
FIG. 3 shows a procedure for reserving a port that takes places between LPAR1-LPARn and representative LPAR of FIG. 1.

FIG. 3 shows a procedure for reserving a port that takes places between LPAR1-LPARn and representative LPAR. FIG. 3 shows an example in which LPAR1, LPAR2 and representative LPAR are involved in port assignment.

The protocol stacks 20*a* and 20*b* of LPAR1 and LPAR2 are provided with port inquiry units 22*a* and 22*b*, respectively, which request assignment of ports for the port assigning unit 42 of the protocol stack 40 of representative LPAR. The port assigning unit 42 returns responses indicating permission or non-permission of port assignment in response to the requests for port assignment from LPAR1 and LPAR2.

Requests from LPAR1 and LPAR2 for port assignment and responses from representative LPAR in response to the requests are via the virtual interface 62. Since the LPARs have unique MAC addresses respectively, they can exchange a request message and a response message using Ethernet frames.

For port assignment, NAT Port Mapping Protocol (NAT-PMP) (http://files.dns-sd.org/draft-cheshire-nat-pmp.txt), which is an existing protocol for reservation of ports, may be used. If we assume that NAT is used, the user is responsible for manually setting information other than mapping information dynamically generated by NAT for mapping between IP addresses and ports. For example, the user must set IP addresses and ports of private machines. In the case of passive open, the router running NAT cannot know on which port to listen to packets with private IP addresses. Therefore, it is necessary for the user to manually set the mapping information in the router which maps between the numbers of listening ports and private IP addresses. NAT-PMP is a protocol that automates the setting. With NAT-PMP, it is possible to communicate the mapping information which maps between private IP addresses and the numbers of listening ports from a terminal to the router in advance, thereby enabling reservation of ports.

In this embodiment, NAT-PMP is used to deal with both active open and passive open so as to allow LPAR1-LPARn to request representative LPAR to assign a port and to receive a response from representative LPAR.

FIG. 4A shows the data format of a packet used to reserve a port according to the embodiment. The format includes fields for "type", "protocol", "port number", "result", "event ID" and "MAC address".

Each packet belongs to one of the four types including REQUEST, REPLY, RENEW and DELETE. A description will be given below of the usage of each type of packet.

(1) REQUEST Packet

The port inquiry unit 22 of LPAR1-LPARn uses a REQUEST packet to request representative LPAR to assign a port. The "protocol" field of the REQUEST packet contains the protocol used, and the "port number" field contains the port number used in the protocol. The port number is specified if a host application or an upper-level protocol defines an available port number. No port number is specified if an arbitrary port number may be assigned. The "MAC address" field contains the MAC address of the LPAR originating the request.

Upon receipt of the REQUEST packet, the port assigning unit 42 of representative LPAR determines whether the protocol entered in the "protocol" field can use the port number entered in the "port number" field. If the port number can be used, the port number is recorded in the port assignment table 44 in association with the MAC address of the originating LPAR entered in the "MAC address" field. If a port number is not specified in the REQUEST packet, the port assigning unit 42 selects an available port number and assigns it to the requesting LPAR.

FIG. 4B shows an example of a port assignment table; Port numbers are associated with MAC addresses. In the illustrated example, port 5000 is associated with MAC1 and port 5002 is associated with MAC2.

By referring to the port assignment table 44, representative LPAR can know which LPAR reserves a pair of protocol and port number, making it possible to route a packet to the MAC address of the reserving LPAR.

The "event ID" field contains an event flag associated with the LPAR originating the request to reserve a port. The flag is used to wake up a thread for receiving a REPLY packet from representative LPAR when a REQUEST packet is sent to representative LPAR.

(2) REPLY Packet

Representative LPAR returns a response to the port assignment request to LPAR1-LPARn by using a REPLY packet. The "result" field of a REPLY packet indicates permission or non-permission of port assignment. If the port assignment is successful, the "port number" field of the REPLY packet contains the port number that can be used in the protocol specified in the "protocol" field.

If the port assignment is not successful, the MAC address of LPAR using the port number specified in the REQUEST packet is contained in the "MAC address" field of the REPLY packet.

The "MAC address" field of the REPLY packet may be used for the following purposes. Normally, if an LPAR is using a port for loopback connection, the connection takes place only within the LPAR. Using the "MAC address" field of a REPLY packet, however, enables other LPARs to access the port by loopback.

For example, it will be assumed that LPAR1 is listening at TCP port 3000. Loopback connection to TCP port 3000 can be made from LPAR1. Meanwhile, LPAR2 can not normally establish loopback connection to TCP 3000 port since the port is not open on LPAR2. The embodiment allows LPAR2 in this situation to obtain the MAC address of the LPAR using the loopback port by referring to the "MAC address" field of the REPLY packet and to transmit a packet to the LPAR involved in the loopback communication.

(3) RENEW Packet

For example, reservation of a port remains valid for only thirty seconds. Representative LPAR deletes the reserved pair of protocol and port number after an a valid time expires. The originating LPAR sends a RENEW packet for maintaining the state of port reservation to representative LPAR.

(4) DELETE Packet

If an event such as closing of a socket occurs in the LPAR that reserved a port, with the result that the reserved port is no longer necessary, the LPAR can explicitly cancel the reservation of the pair of protocol and port number without waiting until a time-out occurs.

Ownership of right to determine a port to be reserved belongs to representative LPAR. Representative LPAR makes available the pair comprising a port number and a protocol that can be used by representative LPAR. Representative LPAR then notifies the originating LPAR that the pair of protocol and port number is available. Therefore, for transmission from representative LPAR of an application-specific packet using the protocol stack of its own, representative LPAR has only to obtain an available local port. Process such as a request for obtaining an available local port is not necessary.

Figure 5:
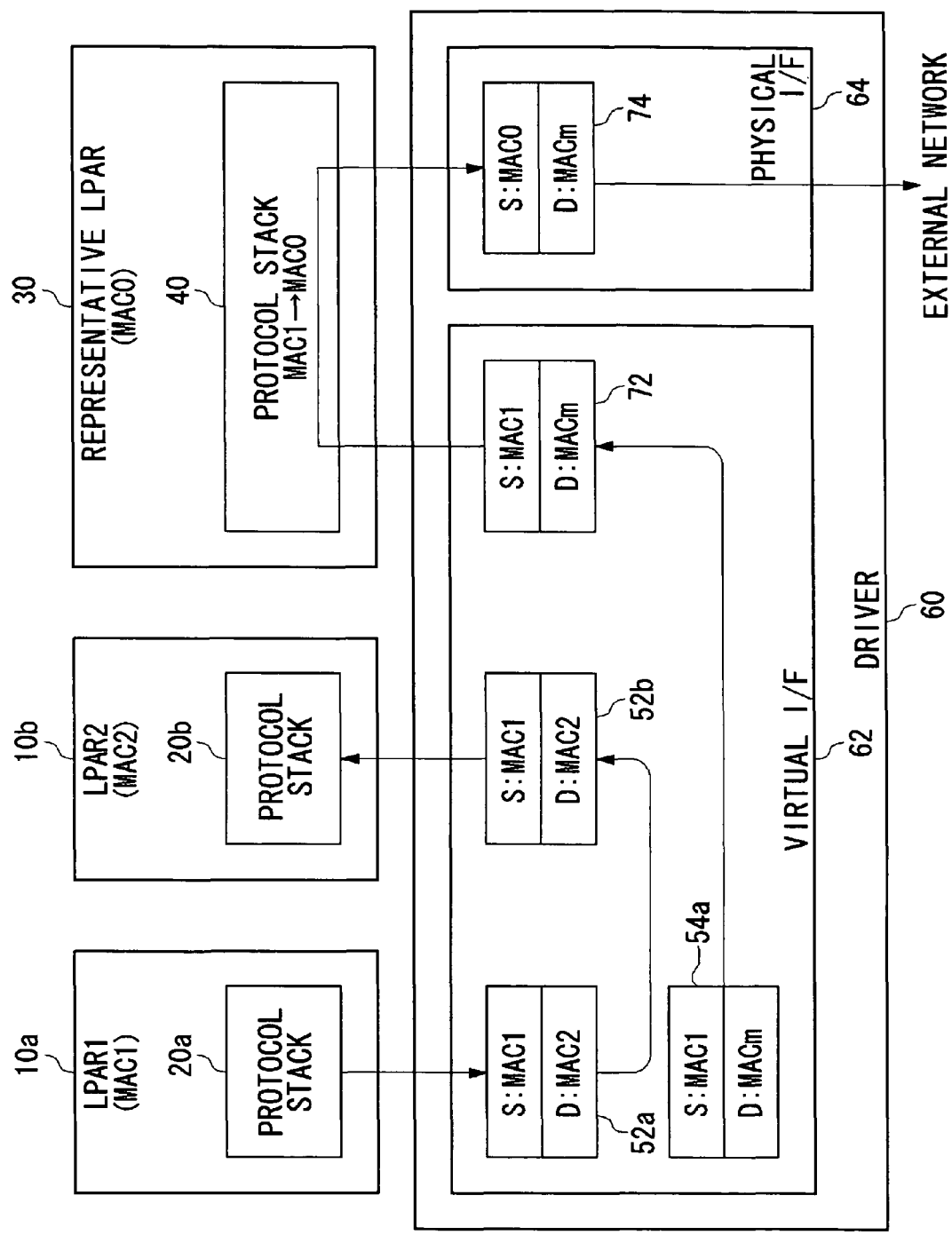
FIG. 5 shows a procedure whereby representative LPAR routes a packet to be transmitted from LPAR1-LPARn to an external entity.

FIG. 5 shows a procedure whereby representative LPAR routes a packet to be transmitted from LPAR1-LPARn to an external entity. In the figure, only LPAR1 and LPAR 2 are shown.

The protocol stack 20a of LPAR1 generates a transmission packet in a memory space in the virtual interface 62 that can be referred to by LPAR1. In this case, two transmission packets 52a and 54a are illustrated.

The first transmission packet 52a is a packet to be transmitted from LPAR1 to LPAR2. The source MAC address is MAC1, and the destination MAC address is MAC2. The second transmission packet 54a is a packet to be transmitted from LPAR1 to an external destination. The source MAC address is MAC1 and the destination MAC address is MACm, which is none of MAC0-MACn.

The virtual interface 62 uses virtual Ethernet or the like to refer to the MAC address so as to transfer the transmission packet from LPAR1 to another LPAR. Since the MAC address of the first transmission packet 52a is MAC2, the packet 52a is transferred to a memory space in the virtual interface 62 that can be referred to by LPAR2 (reference numeral 52b) and is received by the protocol stack 20b of LPAR2.

Meanwhile, the destination MAC address of the second transmission packet 54a does not match any of MAC addresses of the LPARs within the information processing apparatus 100. Therefore, the virtual interface 62 determines that the packet 54a is a packet to be transmitted to an external destination and transfers the packet 54a to a memory space that can be referred to by representative LPAR (reference numeral 72). The packet is received by the protocol stack 40 of representative LPAR.

The protocol stack 40 of representative LPAR uses the function of the address translator 46 to change the source MAC address of the received packet 72 from MAC1 to MAC0. The protocol stack 40 uses the function of the packet router 48 to deliver the translated packet to a memory space in the physical interface 64 as a transmission packet 74. The physical interface 64 transmits the transmission packet 74 to an external network.

If the transmission packet from LPAR1-LPARn is a broadcast packet or a multicast packet, the packet is transmitted to LPARs other than the source LPAR via the virtual interface 62. In addition, representative LPAR routes the packet so as to transmit it to an external destination via the physical interface 64. The packet should be transmitted to the other LPARs within the information processing apparatus 100 as well as to an external destination, as called for in the definition of broadcast or multicast. In broadcast or multicast, a special address is specified as a MAC address. Thus, whether a packet is a broadcast packet or a multicast packet can be determined by referring to the destination address contained in the header of the packet.

Figure 6:
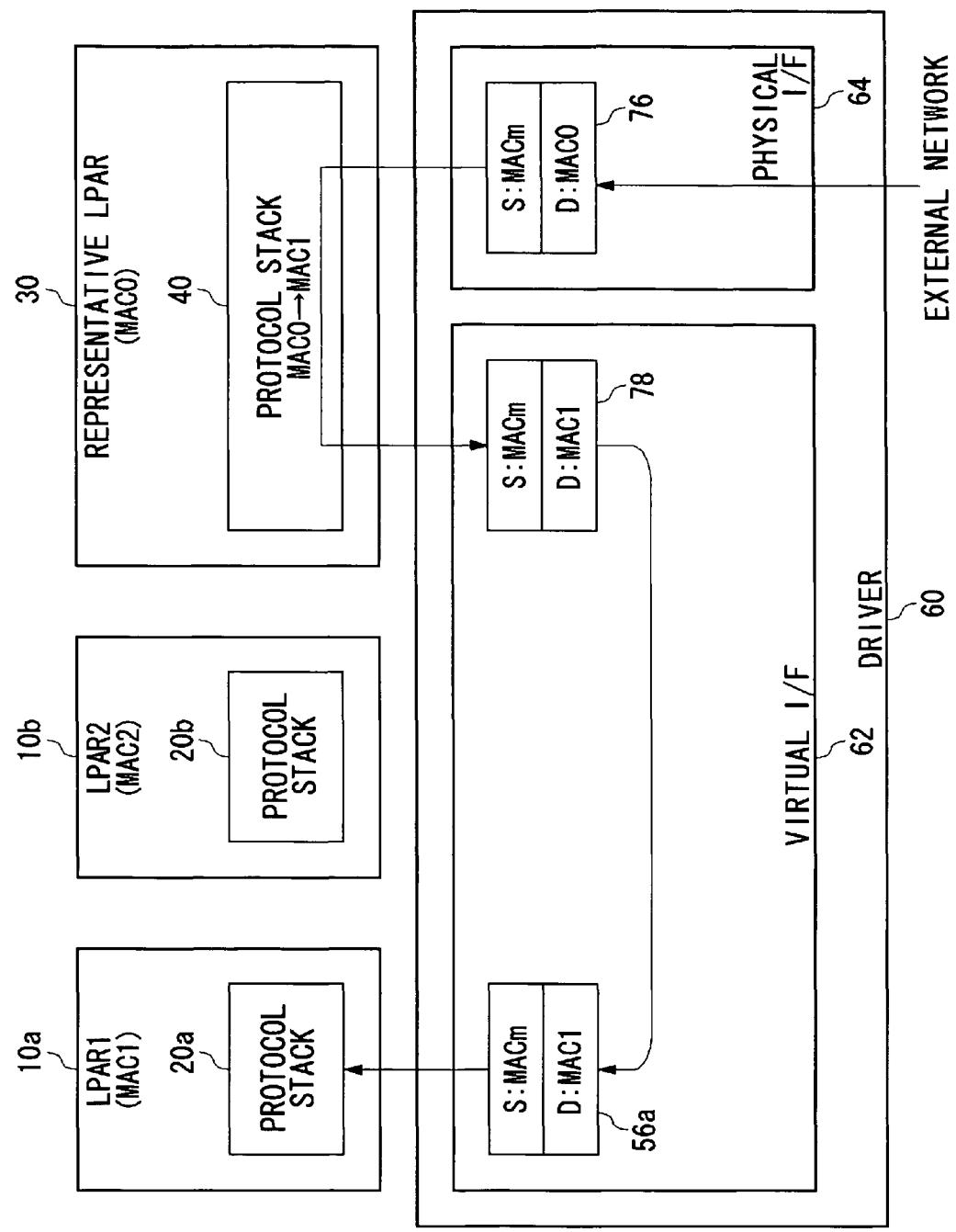
FIG. 6 shows a procedure whereby representative LPAR routes a packet received from an external source to LPAR-LPARn.

FIG. 6 shows a procedure whereby representative LPAR routes a packet received from an external source to LPAR-LPARn.

It will now be assumed that a packet 76 is received from an external destination by the physical interface 64. The source MAC address of the packet 76 is MACm, and the destination address is MAC0, which is the MAC address of representative LPAR. The physical interface 64 delivers the received packet 76 to the protocol stack 40 of representative LPAR.

The protocol stack 40 of representative LPAR processes the received packet according to the protocol so as to obtain the port number. The protocol stack 40 refers to the port number assignment table 44 so as to determine whether the port that received the packet is assigned to any of LPAR1-LPARn. If the receiving port is not assigned to any of LPAR1-LPARn, the protocol stack 40 processes the packet as being destined to itself. If the receiving port is assigned to any of LPAR1-LPARn, the protocol stack 40 uses the function of the address translator 46 to translate the destination MAC address.

It will be assumed that the port assignment table 44 associates the receiving port with MAC1 of LPAR1. The address translator 46 translates the destination MAC address of the received packet 76 by changing it from MAC0 to MAC1. The packet router 48 delivers the packet 78 in which the destination MAC address has been changed to MAC1 to a memory space of the virtual interface 62 for transmission to LPAR1.

The virtual interface 62 transfers the transmission packet 78 to a memory that can be referred to by LPAR1 (reference numeral 56a). The protocol stack 20a of LPAR1 receives the packet.

If there is a unknown request for communication from an external network (e.g. TCP connection from an external network), that can be processed by representative LPAR and need not be routed to the other LPARs. A request for communication by a protocol that does not support ports (e.g. when a ping command is received from an external network using Internet Control Message Protocol (ICMP)) may also be responded to by representative LPAR. If an incoming packet is received by a protocol that supports ports but the port is encrypted by IPsec, it too may be handled by representative LPAR. If representative LPAR is only provided with minimum implementation of network protocols, other LPARs with full implementation may process the packet.

In the case of an incoming packet received by the Address Resolution Protocol (ARP), which also does not support ports, it may be ensured that all of LPAR1-LPARn receive an ARP reply by causing representative LPAR to respond to an ARP request and to transfer ARP replies to LPAR1-LPARn. Similarly, an Echo request of ICMP may be responded to by representative LPAR so that an Echo reply is received by all of LPAR1-LPARn.

As described above, according to the information processing apparatus 100 of the embodiment, multiple LPARs can share an IP address so that communication with an external entity is enabled by allowing representative LPAR to route packets. Since the inventive approach does not assume the use of a router and does not use the NAT function, simple and efficient communication is achieved. Plug-and-play port mapping, whereby the LPARs utilize respective communication ports of representative LPAR, enables the multiple LPARs to share a single communication line, facilitating efficient use of network resources.

NAT requires recalculation of a checksum and modification of a checksum value contained in the IP header when an IP address is changed. As such, NAT requires a "weighty" process. In contrast, the information processing apparatus 100 according to the embodiment only requires changing the MAC address and does not require a complicated process as that of NAT. In secure communication using IPsec, IP packets are encrypted. Therefore, NAT cannot change the checksum value. Meanwhile, the embodiment does not assume the use of the NAT function and so can handle secure communication using IPsec without problems.

Communication between LPARs within the information processing apparatus 100 is conducted using existing network functions such as virtual Ethernet. Therefore, it is not necessary to design a communication function to exclusively serve LPAR-to-LPAR communication. Thus, the inventive approach is favorable in respect of ease of installation. Since the multiple LPARs are connected to each other via a virtual network, the system can be configured more inexpensively than when communication equipment such as a switching hub is used.

The description of the invention given above is based upon one embodiment. The embodiment described is only illustrative in nature and various variations in constituting elements and processes involved are possible. Those skilled in the art would readily appreciate that such variations are also within the scope of the present invention. Some such variations will now be described.

In the embodiment, a single computer system is divided into multiple logical partitions so that operating systems are independently run in the respective logical partitions. The logical partitioning technology may also be applied to a multiprocessor system. By allowing a hypervisor run on one of the processors to assign computing resources such as processors, memories and I/O devices in the multiprocessor system to logical partitions and to control the resources, the multiple logical partitions can be viewed as virtual computers. In this case, the processors in the multiprocessor system may be assigned to respective logical partitions on a one-to-one basis. Alternatively, the resources of a single processor may be assigned to multiple logical partitions by time-division switching. In the latter case, a larger number of logical partitions than the number of physical processors in the multiprocessor system may be generated for execution. Alternatively, the inventive logical partitioning technology may be applied to an information processing apparatus provided with a multi-core processor in which multiple processor units are packaged by integration in a single chip.

In the described embodiment, a case is described where one LPAR within the information processing apparatus 100 communicates with an external entity. In an environment in which it is possible to obtain two or more global IP addresses, two or more representative LPARs each having a global IP address may communicate with an external entity, on behalf of the LPARs sharing one of the global IP addresses.

In the described embodiment, the use of virtual Ethernet is assumed so that communication between LPARs using Ethernet frames is enabled by a virtual network driver. Alternatively, other means may be employed for LPAR-to-LPAR communication. For example, a communication function exclusively used for LPAR-to-LPAR communication may be provided so that data is transferred between LPARs by a unique protocol. If LPAR-to-LPAR communication is designed originally, it will enable communication that does not depend on MAC addresses. There will be no need to assign different MAC addresses to multiple LPARs. The LPARs may share the same MAC address. For LPAR-to-LPAR communication, the network driver may copy data to be transmitted from a memory space of a source LPAR to a memory space of a destination LPAR. Alternatively, packets may be transferred on the physical layer using a switch or a hub instead of virtual Ethernet.

In the described embodiment, LPAR1-LPARn transfer a packet to representative LPAR for communication with an external entity. Representative LPAR translates the source MAC address before transmitting the packet to an external destination. Alternatively, LPAR1-LPARn may replace the source MAC address by the MAC address of representative LPAR and transmit the packet to an external destination by themselves. In this case, too, representative LPAR is responsible for receiving a packet from an external source.

The present invention may also be applied to a cluster of computers in which multiple independent computers are mutually connected. In this case, the multiple computers are connected to physical equipment such as a switching hub. The computers share an IP address but their MAC addresses are different. By configuring one of the computers to communicate with an external entity on behalf of the other computers, communication with an external entity is enabled while sharing an IP address, like the information processing apparatus 100 according to the embodiment comprised of multiple LPARs. The cluster of computers as described above may be used to provide a unique server technology.

Figure 7:
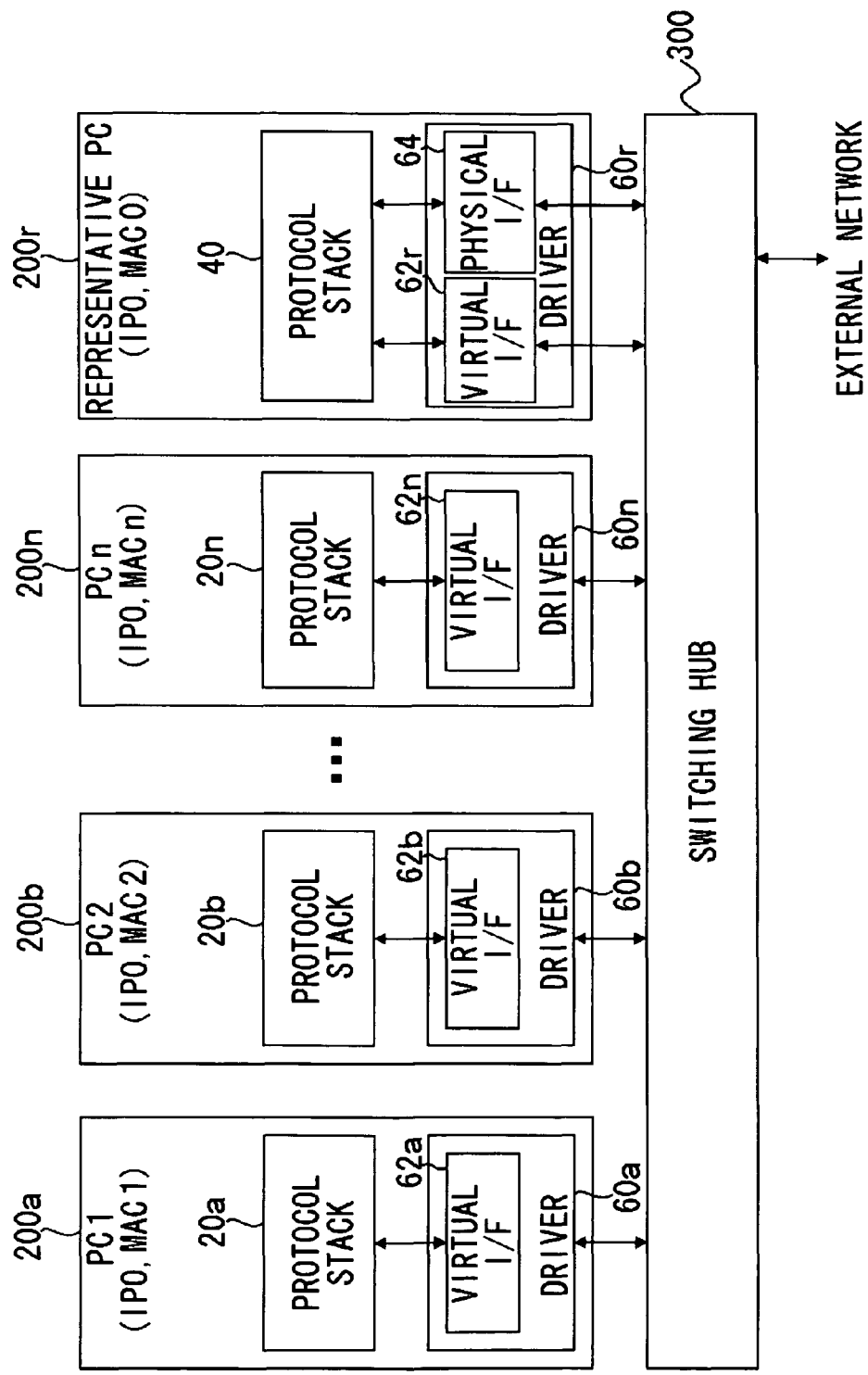
FIG. 7 shows the structure of a cluster of computers according to an embodiment.

FIG. 7 shows the structure of the cluster of computers. Multiple computers (for instance, personal computers or workstations) 200a, 200b, . . . , 200n and 200r are connected to a switching hub 300. Among these computers, one computer 200r (referred to as representative PC) communicates with an external entity on behalf of the other computers 200a, 200b, . . . , 200n (referred to as PC1, PC2, . . . , PCn). MAC addresses MAC1, MAC2, . . . , MACn are assigned to PC1, PC2, PCn respectively and a MAC address MAC0 is assigned to representative PC. An IP address IP0 is shared by PC1, PC2, . . . , PCn and representative PC.

PC1, PC2, . . . , PCn have the protocol stacks 20a, 20b, . . . , 20n described in FIG. 1 respectively and representative PC has the protocol stack 40 described in FIG. 1. In FIG. 1, the driver 60 is shared by LPAR1-LPARn and representative LPAR and the driver 60 is provided with the virtual interface 62 and the physical interface 64. In FIG. 7, PC1, PC2, . . . , PCn and representative PC have their own drivers 60a, 60b, . . . , 60n and 60r respectively. The drivers 60a, 60b, . . . , 60n of PC1, PC2, . . . , PCn are provided virtual interfaces 62a, 62b, . . . , 62n respectively, and the driver 62r of representative PC is provided a virtual interface 62r and a physical interface 64.

The virtual interfaces 62a, 62b, . . . , 62n and 62r of PC1, PC2, . . . , PCn and representative PC perform the same packet transfer process as the virtual interface 62 of FIG. 1, except that the packets are transferred via the switching hub 300. The physical interface 64 of representative PC communicates with an external network via the switching hub 300.

The protocol stack 40 of representative PC includes the components described in FIG. 2. Except that PC1-PCn are interconnected via the switching hub 300, the description with reference to FIG. 2 to FIG. 6 can be applied to the structure of FIG. 7, if PC1-PCn are regarded as LPAR1-LPARn respectively.

What is claimed is:

1. An information processing apparatus provided with a plurality of logical partitions assigned logically divided computing resources, and configured such that operating systems are independently run in the respective logical partitions, wherein at least one of the plurality of logical partitions is a designated logical partition that is assigned a network address uniquely-identified by an external network on behalf of the plurality of logical partitions, the network address to be shared by the plurality of logical partitions through the designated logical partition, and wherein the plurality of logical partitions are connected to each other via a virtual network interface for performing internal communication between the plurality of logical partitions and the designated logical partition is connected to a physical network interface for performing communication with the external entity, the designated logical partition comprising:

a port assignment unit which assigns an available port number to a logical partition other than the designated logical partition ports available for communication with an external entity; and a packet forwarding unit that forwards routes a packet that has been received by the designated logical partition via the physical network interface, using an assigned port, to the logical partition to which the respective port number has been assigned via the virtual network interface.

2. The information processing apparatus according to claim 1, wherein the plurality of logical partitions are assigned respective partition physical addresses, the designated logical partition further comprises an address translator, which replaces the destination physical address of the packet received with the partition physical address of a respective logical partition to receive the packet, wherein the packet forwarding unit transmits the packet, in which the destination physical address has been replaced, to the respective logical partition to receive the packet.

3. The information processing apparatus according to claim 2, wherein the designated logical partition receives a packet from a source logical partition among the plurality of logical partitions for transmission to an external entity, the address translator replaces the partition physical address of the packet forwarded from the source logical partition with the physical address of the designated logical partition, and the packet forwarding unit transmits the packet with the physical address of the designated logical partition to an external entity.

4. The information processing apparatus according to claim 3, further comprising a network driver, which connects between the plurality of logical partitions assigned respective partition physical addresses and controls communication performed by the plurality of logical partitions, wherein, if the destination physical address of a packet received from one of the plurality of logical partitions does not match any of the respective partition physical addresses of the logical partitions, the network driver transmits the packet to the designated logical partition, as a packet to be transmitted to an external entity.

5. The information processing apparatus according to claim 4, wherein, if the destination physical address of a packet received from one of the plurality of logical partitions is the respective partition physical address of one of the logical partitions, the network driver transmits the packet to the respective logical partition corresponding to the destination physical address.

6. The information processing apparatus according to claim 4, wherein, if a packet received from a source logical partition among the plurality of logical partitions for transmission to an external entity is a broadcast packet or a multicast packet, the network driver transmits the packet to all logical partitions other than the source logical partition and also transmits the packet to the designated logical partition.

7. The information processing apparatus according to claim 5, wherein, if a packet received from a source logical partition among the plurality of logical partitions for transmission to an external entity is a broadcast packet or a multicast packet, the network driver transmits the packet to all logical partitions other than the source logical partition and also transmits the packet to the designated logical partition.

8. The information processing apparatus according to claim 4, wherein the network driver comprises a virtual network interface that connects between the plurality of logical partitions and a physical interface, which connects the designated logical partition to an external network.

9. The information processing apparatus according to claim 5, wherein the network driver comprises a virtual network interface that connects between the plurality of logical partitions and a physical interface, which connects the designated logical partition to an external network.

10. A non-transitory computer-readable medium having encoded thereon a computer program for controlling communication in an information processing apparatus provided with a plurality of logical partitions assigned logically divided computing resources, and configured such that operating systems are independently run in the respective logical partitions, executable to perform:

wherein, if at least one of the plurality of logical partitions is a designated logical partition that is assigned a network address uniquely-identified by an external network on behalf of the plurality of logical partitions, the network address being shared by the plurality of logical partitions through the designated logical partition, the plurality of logical partitions being connected to each other via a virtual network interface for performing internal communication between the plurality of logical partitions, and the designated logical partition being connected to a physical network interface for performing communication with the external entity, then causing the designated logical partition to assign an available port number to a logical partition other than the designated logical partition for communication with an external entity, and forwarding a packet that has been received by the designated logical partition via the physical network interface from an external entity, using an assigned port to the logical partition to which the respective port number has been assigned via the virtual network interface.

11. A communication control method for an information processing apparatus provided with a plurality of logical partitions assigned logically divided computing resources, and configured such that operating systems are independently run in the respective logical partitions, wherein, if at least one of the plurality of logical partitions is a designated logical partition that is assigned a network address uniquely-identified by an external network that communicates with an external entity on behalf of the plurality of logical partitions, the network address being shared by the plurality of logical partitions through the designated logical partition, the plurality of logical partitions being connected to each other via a virtual network interface for performing internal communication between the plurality of logical partitions, and the designated logical partition being connected to a physical network interface for performing communication with the external entity, then the designated logical partition assigns an available port number to a logical partition other than the designated logical partition for communication with an external entity, and forwards a packet that has been received by the designated logical partition via the physical network interface from an external entity, using an assigned port to the logical partition to which the respective port number has been assigned via the virtual network interface.

12. The information processing apparatus according to claim 1, wherein the logical partitions comprise computers connected to each other so as to form a cluster.

* * * * *